United States Patent [19]

Ovard

[11] Patent Number: 4,508,552
[45] Date of Patent: Apr. 2, 1985

[54] SELF-LOCKING MIST ELIMINATOR

[76] Inventor: John C. Ovard, 3465 Ridgeview Dr., Santa Rosa, Calif. 95404

[21] Appl. No.: 230,903

[22] Filed: Feb. 2, 1981

[51] Int. Cl.³ .............................................. B01D 45/16
[52] U.S. Cl. .................................. 55/440; 55/257 PV
[58] Field of Search ....... 55/257 PV, 257 R, 257 QV, 55/257 PP, 257 NP, 440, 442–446, 491, DIG. 37; 261/DIG. 11, DIG. 77; 98/121 R; 403/240–242, 346

[56] References Cited

U.S. PATENT DOCUMENTS

| | | | |
|---|---|---|---|
| 1,686,144 | 10/1928 | Colbert | 55/440 |
| 2,583,171 | 1/1952 | Green et al. | 55/257 PV |
| 2,752,005 | 6/1956 | Avera et al. | 55/440 |
| 2,892,509 | 6/1957 | Baker et al. | 55/257 PV |
| 2,911,011 | 11/1959 | Niehart | 55/440 |
| 3,276,193 | 10/1966 | Lamb | 55/440 |
| 3,748,832 | 7/1973 | Furlong et al. | 55/440 |
| 4,014,669 | 3/1977 | Thompson et al. | 55/440 |
| 4,053,292 | 10/1977 | Schneider et al. | 55/257 PV |

FOREIGN PATENT DOCUMENTS

| | | | |
|---|---|---|---|
| 148657 | 10/1952 | Australia | 55/440 |
| 644686 | 10/1950 | United Kingdom | 55/257 PV |

OTHER PUBLICATIONS

"Spectra" Bulletin by Therinatec Corp., Santa Rosa, Calif., Jul. 1979.
Soplasco Eliminator Blades Bulletin, by Southern Plastics Co., Box 815, Columbia, S.C., May 1964.

Primary Examiner—Kathleen J. Prunner
Attorney, Agent, or Firm—Limbach, Limbach & Sutton

[57] ABSTRACT

A self-locking mist eliminator is disclosed for connecting a plurality of longitudinally extending eliminator blades having front and back surfaces to a pair of end plates wherein the end plates have a pair of spaced-apart flanges projecting from one side thereof and each provided with a series of notched openings for receiving a portion of the blades. Each blade has a pair of spaced-apart openings in the blade surfaces at each end thereof. The notched openings in the end plates are enlarged in at least one direction lengthwise of the flange to provide a pin member for engagement in one of the spaced-apart openings in a blade surface and with the entrance corners into each of the notched openings chamfered whereby the blades can be pressed toward an adjacent end plate to have the end of the blade enter one of the notched openings until the pin member adjacent thereto engages the blade opening.

3 Claims, 6 Drawing Figures

FIG._1.

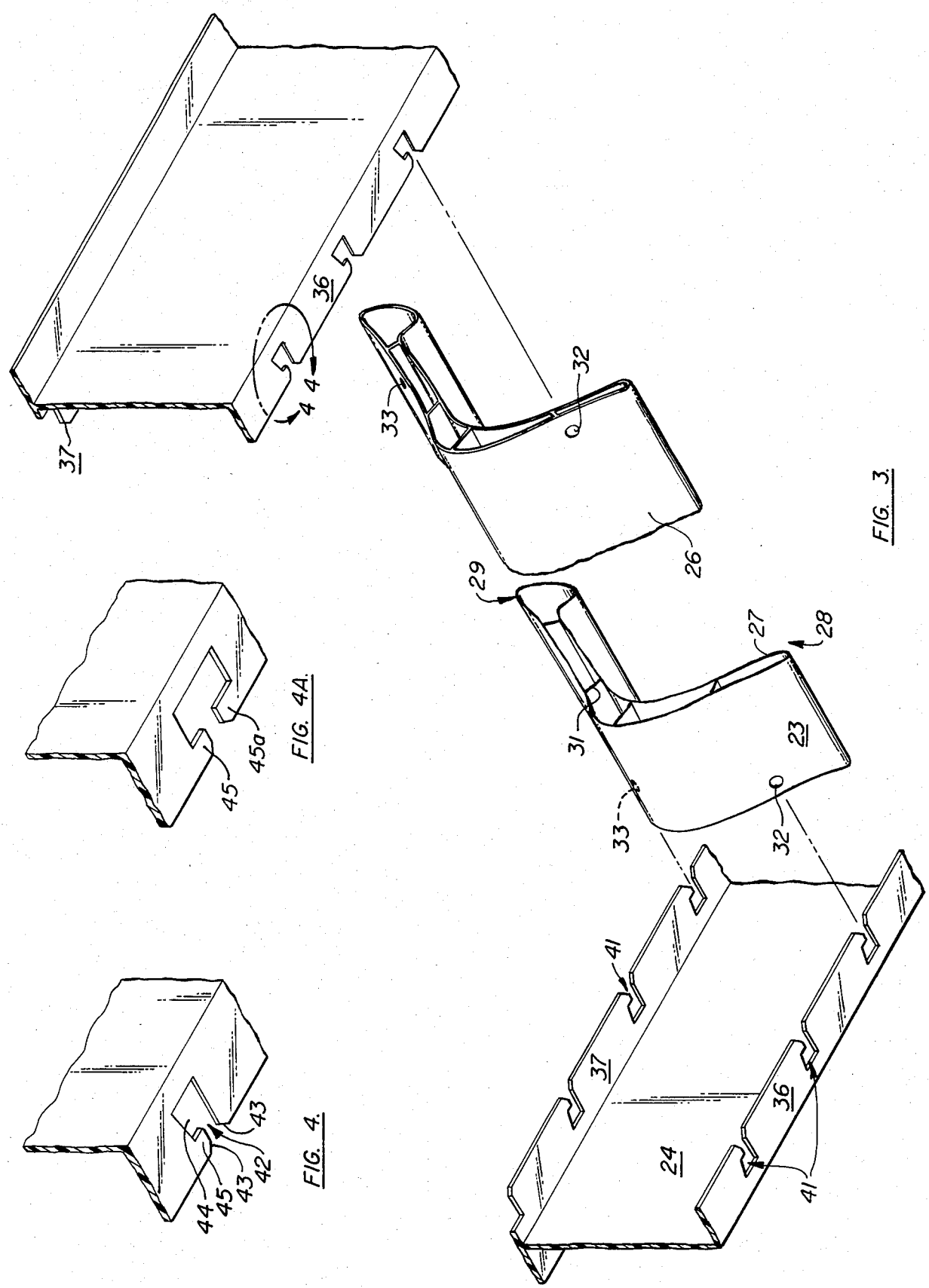

SELF-LOCKING MIST ELIMINATOR

BACKGROUND OF THE INVENTION

The present invention relates in general to a self-locking mist eliminator such as is useful in cooling towers.

Mist eliminators or drift eliminators are a highly efficient means for collecting droplet mists in a gas stream. One such eliminator blade assembly is described in my copending application Ser. No. 962,982, filed Nov. 22, 1978. Besides a specific blade configuration illustrated therein, that application describes a simple mechanical interlocking means for connecting the blades and side plates which allows mist eliminators to be assembled into panels with dimensional accuracy and consistency during and after assembly. The construction described and illustrated in that application includes the provision of a pair of longitudinally extending notches into each end of each blade which mate with corresponding notches in a pair of flanged supporting side panels and with a notched out portion in an airfoil section at each end of the blade for engaging a projecting rib on one of the side panel flanges. While this configuration provides a reasonably good interconnection between the blades and the end panels, the assembly does require a fair degree of time in properly orienting and interconnecting the blades and end plates and provides against longitudinal separation of the blade from the end plate only at the outlet portion of blade.

Other blade and end plate connection structures are illustrated in the prior art. Typically blades or vanes are supported in notches positioned in support members which may also cooperate with a notch in the blade or vane such as, for example, in U.S. Pat. Nos. 2,583,171 to N. P. Green, et al.; 2,892,509 to D. R. Baker, et al. and 2,911,011 to W. M. Neihart. U.S. Pat. No. 3,748,832 to D. B. Furlong, et al. discloses the use of pins which extend through openings in the end plates to grasp the ends of the blades thereby to connect the blades to the end members. U.S Pat. No. 3,276,193 to Lamb discloses a subassembly connection composed of two channel members for clamping an array of blades via a fringe member extending along each longitudinal edge of each blade. U.S. Pat. No. 4,014,669 to S. E. Thompson, et al. discloses an assembly wherein deformable resilient drift eliminator blades are provided with notches on one side thereof adjacent the inlet and outlet edges and which engage portions of end plates that are provided with slots which have an appearance similar but distorted from the cross-sectional appearance of the end of the blade so that the blade can be distorted for insertion into the slot of the end plate and moved until the slots in the blades engage the end plate and fix the blade against longitudinal movement. This construction takes a fair amount of manipulation of the blades in establishing an assembly. Where a particular cooling tower configuration can include thousands and thousands of blades, considerable time and expense can be involved in the assembly of the blades and end plates.

SUMMARY OF THE INVENTION

Broadly stated the present invention is directed to a self-locking mist eliminator of a plurality of longitudinally extending eliminator blades each having a front and a back surface and at least a pair of spaced apart openings in the blade surfaces at each end thereof for connection to a pair of end plates each having a pair of spaced-apart flanges projecting from one side thereof and each flange having a series of notched openings enlarged in at least one direction lengthwise of the flange to provide a pin member for engagement in one of the spaced apart openings in the blade surfaces.

A feature and advantage of the present invention is the easy assembly of the blades and end members into a mechanically interlocked unit.

In accordance with another aspect of the present invention the blades are substantially hollow and the entrance corners into each of the notched openings of the end plate flanges is chamfered whereby the ends of each of the blades can be pressed toward an adjacent end plate and the hollow blade will deflect as the end enters one of the notched openings until the pin member adjacent thereto engages the blade opening.

A feature and advantage of the aforementioned aspect of the present invention is the easy and economical assembly of a multitude of blades into end members for providing mist eliminator panels which, once thereby engaged, are locked against disassembly.

In accordance with another aspect of the present invention both openings of each pair of spaced-apart blade openings are located in the same surface of the blade. In accordance with this aspect of the present invention alignment of the blade and end support members can be observed from the same side of the support blade, and in the event that it is necessary or desirable to disassemble the blades from the end support members, the surface of the blade can easily be depressed on the same side of the blade adjacent the two openings and the blade pulled from engagement with the end member.

Other features and advantages of the present invention will become more apparent upon a perusal of the following specification taken in conjunction with the accompanying drawings wherein similar characters of reference refer to similar structures in each of the several views.

DESCRIPTION OF THE DRAWINGS

FIG. 3 is a view similar to FIG. 2 but with the parts exploded and partially broken away.

FIG. 4 is an enlarged view of a portion of the structure shown in FIG. 3 delineated by line 4—4.

FIG. 4A is a view similar to FIG. 4 showing an alternative embodiment of the present invention.

DESCRIPTION OF PREFERRED EMBODIMENT

Figure 1:
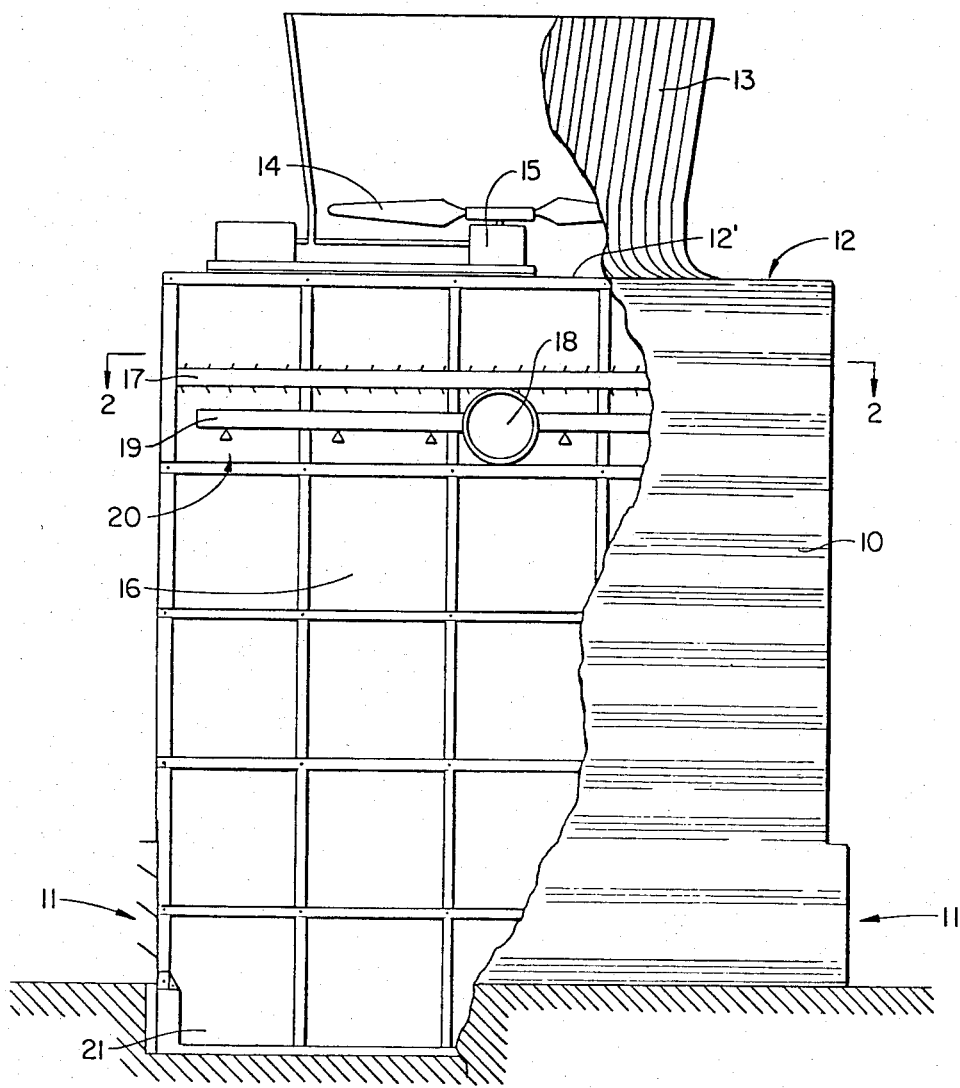
FIG. 1 is a schematic elevational view, partially broken away, illustrating a counterflow cooling tower incorporating the present invention.

A counterflow cooling tower as shown in FIG. 1 represents a typical application of mist eliminators to a direct contact heat exchanger. Those skilled in the art will recognize that the present invention is equally adaptable to crossflow cooling towers, gas scrubbers and other industrial processes where a moving gas carries entrained liquid droplets which must be removed from the gas stream.

Referring to FIG. 1, a mechanical draft counterflow cooling tower consisting of a housing 10 with air inlets 11 at the bottom on two opposing sides and top desk 12 with an opening 12' therein connected to a fan shroud 13. A fan 14 in the throat of the shroud 13 is rotated by a fan drive system 15 and draws air through the cooling tower housing 10. Air is drawn through the air inlets 11, returns and flows vertically upward through a direct contact heat exchange section 16, through the mist eliminator section 17 and upward through the fan 14 after which it is discharged to the atmosphere at the exit of the fan shroud 13 in a heated condition. Concurrently, heated water is pumped through a water distribution system to the top of the tower where it enters a header 18 and flows to lateral pipes 19 and is sprayed uniformily over the entire plan area within the housing 10 by a plurality of spray nozzles 20 in direct communication with the lateral pipes 19. Liquid thus distributed falls by gravity counter-current to the direction of air flow through the heat exchanger section 16 until it reaches the water collecting basin 21 in the cooled condition. In the heat exchanger section the water comes in contact with a fill material whose primary purpose is to create the most intimate mixing of water and air practical to promote water cooling by a combination of evaporation and sensible heat transfer. The fill material disperses the water by a combination of splash promoting means and the formation of thin liquid films on the surfaces of the fill material and structure. The smaller droplets created by this process and those generated immediately above by the spray nozzles 20 become entrained and are carried upward with the main flow of air as a result of their light weight and the relatively higher viscous and aerodynamic forces imposed on them by the upwardly moving air. In the absence of a mist eliminator section 17 these droplets would be discharged to the atmosphere along with the main body of heated air. As the air velocity dissipates in the atmosphere these droplets will fall like rain in the surrounding area. This creates a hazard to electrical equipment and can also create corrosion problems on equipment in the immediate vicinity of the tower. In instances where sea or brackish water is circulated through the system these problems can be severe and additional irreparable damage to plant life may also occur due to the salt content.

Figure 2:
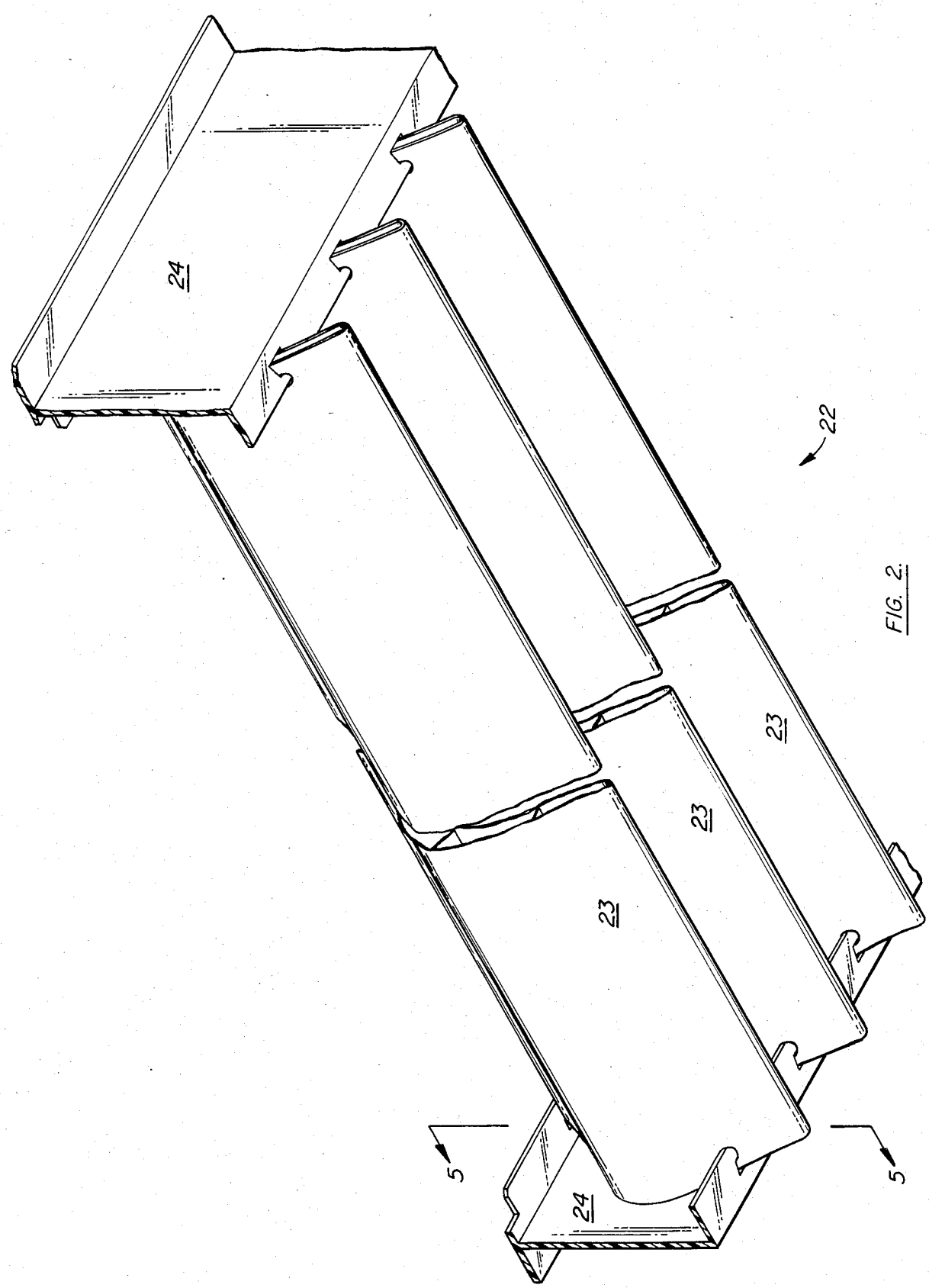
FIG. 2 is a perspective view, partially foreshortened, illustrating a mist eliminator panel of the present invention.
Figure 5:
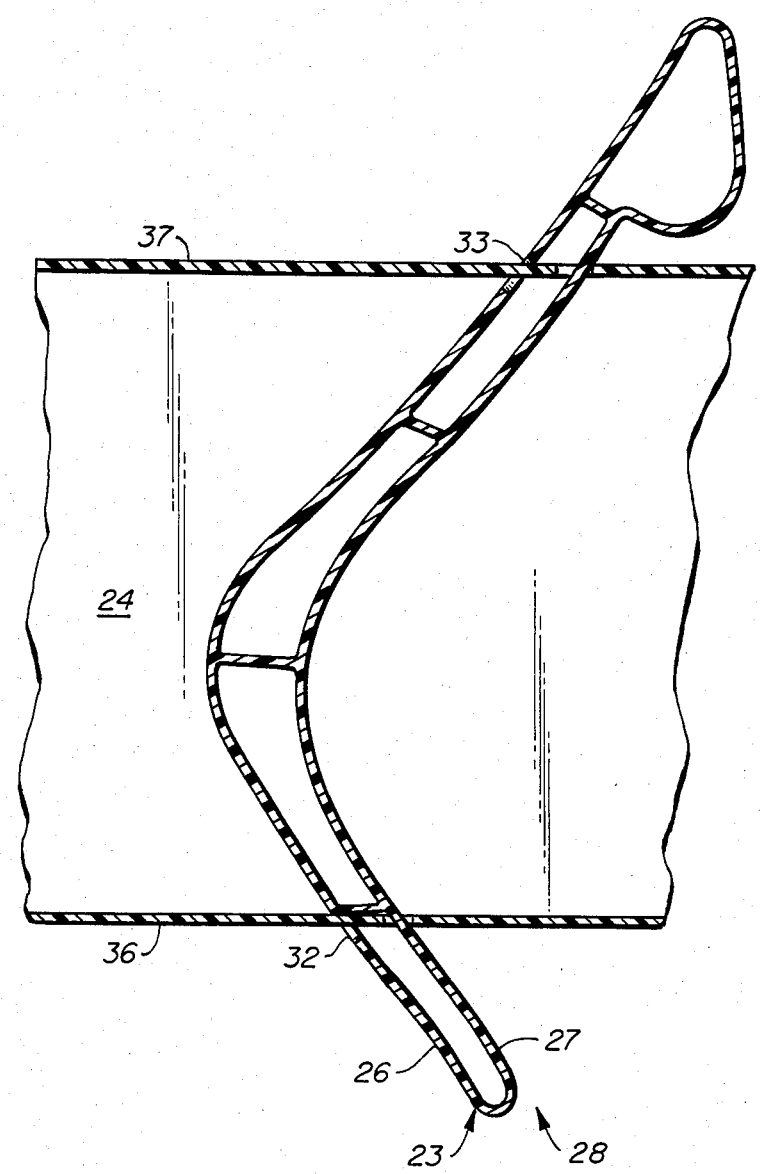
FIG. 5 is an enlarged elevational sectional view of a portion of the structure shown in FIG. 2 taken along line 55 in the direction of the arrows.

The mist eliminator section 17 of the present invention consists of a plurality of preassembled mist eliminator panels or assemblies 22 which can best be seen in FIG. 2. Each mist eliminator panel consists of a plurality of longitudinally extending eliminator blades 23 which can take the form of various profiles such as the one specifically described, illustrated and claimed in my aforementioned patent application Ser. No. 962,982. Alternatively, by way of example the cross-sectional configuration of the blades 23 can take the form of the blade constructions illustrated in the aforementioned Furlong et al. U.S. Pat. No. 3,748,832 and Thompson et al. U.S. Pat. No. 4,014,669. The blades 23 are connected to a pair of end plates 24 by a mechanical interlocking means as hereinafter described in greater detail. Entrained droplets impinge on blade surfaces where they combine into larger droplets or liquid films which ultimately fall by gravity to the water cooling means 21 of the tower. Typically the panels 22 are mounted in a slightly tilted position so that the liquid accumulated on the blade surfaces will flow along the length of the surfaces for removal at the ends.

The mechanical interlocking relationship between the blades 23 and end plates 24 of the eliminator panels 22 prevents blade rotation and movement in any direction. It also provides a positive means of establishing and fixing the space and position relationships between adjacent blades as well as the blades and end plates. Movement of blades and the end plates is totally restricted and disengagement of the blades and end plates is prevented once assembly is completed. Assembly does not require fasteners or bonding agents and can be accomplished quickly and easily without the use of special tools or equipment. In addition, end plate structural strength and dimensional stability are not compromised by a plurality of slots of large dimension relative to the overall width of either the end plate web or flange elements.

The unique mechanical interlocking assembly method of the present invention can best be described by referring to FIGS. 2-5.

As illustrated there, each mist eliminator blade 23 includes front and back surfaces 26 and 27 which establish the flow from the inlet edge 28 to the outlet edge 29 of the blades 23. Typically the blades 23 are formed of light weight material such as polyvinyl chloride compounds which have high strength and chemical resistance properties and are formed by extrusion with internal ribs 31. This construction provides a slightly flexible characteristic to the blade surfaces which help enable assembly of the panel as described in greater detail below.

Each blade is provided at each end with at least a pair of spaced-apart openings 32 and 33 in the blade surfaces at each end thereof. These openings 32 and 33, which are typically circular holes, are spaced-apart between the inlet and outlet edges of the blades 23 for interconnection with the end plates 24 as will be described in greater detail below.

Each of the end plates 24 is provided with a pair of spaced-apart flanges 36 and 37 which project from one side of the panel 24 toward the opposite end plate 24. A series of openings or notches 41 are provided in each of the flanges for receiving a portion of the blades 23. The details of the notches 41 are illustrated in FIG. 4 wherein the opening extends from the free end of the flange 36 or 37 toward the body of the end plate 24 of a width substantially equal to the thickness of the blade 23 at the location of the respective blade spaced apart openings 32 and 33. The flange at the entrance to opening 42 is chamfered at 43, preferably on both sides of the opening 42.

In that portion of the opening 42 toward the body of the end plate 24, the opening 42 is enlarged as at 44 in at least one direction lengthwise of the flanges 36 and 37 to provide a pin or tab member 45 along the outer edge of the flanges 36 and 37 for engagement in one of the spaced apart openings 32, 3 of the blade members 23. The width of the pin or tab members 45 is selected for engagement within the openings 32 and 33 for locking the blade members 23 to the end plates 24.

Preferably both openings 32 and 33 in the blade member 23 are located in the same surface 26 or 27 of the blade 23. It will be appreciated that the opening 42 can be enlarged in both directions lengthwise of the flanges 36 and 37 to provide a second pin or tab member 45A as illustrated in FIG. 4A and principally where a corresponding pair of openings 32A and 33A would be provided in the other of the two surfaces 26 or 27 of the blade member 23.

The blades and end plates are assembled in a work station. Typically a work station is established by positioning a pair of spaced apart rails on a flat support surface with a distance between the rails slightly larger than the width of a given assembled panel. Each blade 23 is positioned with the openings 32 and 33 adjacent a given pair of notches 41 in one of the end plates 24. Longitudinal pressure is applied to the blade toward the end plate which causes the blade to be channeled into the opening 42 through the chamfered corners 43 and deflect the blade surfaces sufficiently until the pin 45 engages the appropriate opening 32 or 33. Next, the opposite end plate 24 is aligned with the opposite ends of the blades 23 and pressure applied until all of the blade members are then interconnected with the opposite end plate 24.

It will be appreciated from the foregoing that the panels 22 can be assembled rapidly and efficiently by a single individual to provide a mechanically interconnected assembly ready for installation.

While the embodiment described herein is considered as the preferred embodiment, it will be understood that various improvements and modifications may be made and it is intended to cover in the claims all such modifications and improvements as fall within the spirit and scope of the invention.

What is claimed is:

1. In a self-locking mist eliminator for removing droplets of liquid entrained in a gas stream having a plurality of longitudinally extending eliminator blades positioned in side-by-side spaced apart relation for passing a gas stream transversely through the space between adjacent blades from an inlet to an outlet, each blade having a front surface and a back surface, and a pair of end plates for supporting the opposite ends of said blades with each of said end plates having at least one notched flange extending longitudinally of the end plate and transversely of the blades and projecting toward the opposite end plate, the improvement comprising:

said notched flange of each of said end plates having a series of notched openings for receiving a portion of each of said blades, each notched opening being enlarged in at least one direction longitudinally of the flange to provide an integral pin member adjacent the free edge of the flange and extending longitudinally of the flange, each of said blades having at each end thereof at least one opening in the surfaces thereof, said blade opening spaced from the end of the blade between said inlet and outlet edges of said blades for receiving one of said pin members with said pin members extending transversely of said blades for engagement between each blade and each end flange whereby each end of each blade is mechanically interconnected with one of said end plates.

2. A self-locking mist eliminator structure for removing droplets of fluid entrained in a gas stream comprising:

a plurality of longitudinally extending substantially hollow eliminator blades for positioning in side-by-side spaced apart relation for passing a gas stream transversely through the space between adjacent blades from an inlet to an outlet, each blade having a front surface and a back surface and at least a pair of spaced-apart openings in the blade surfaces spaced inwardly from each end thereof, and a pair of end plates for supporting the opposite ends of said blades, each of said end plates having a pair of spaced-apart flanges projecting from one side thereof longitudinally thereof, each of said flanges of said pair of plates having a series of notched openings for receiving a portion of each of said blades, each said notched opening being enlarged in at least one direction lengthwise of the flange to provide an integral pin member extending lengthwise of the flange for engagement in one of said spaced-apart openings in said blade surfaces, the entrance corners into each of said notched openings being chamfered whereby each end of each of said blades can be pressed toward an adjacent end plate and the hollow blade will deflect as the end enters one of said notched openings until the pin member adjacent thereto engages the blade opening transversely of the blade whereby each end of each blade is mechanically interlocked with one of said end plates.

3. The mist eliminator structure of claim 2 wherein both openings of each pair of spaced-apart blade openings at each end of each blade are located in the same surface of said blade.

* * * * *